(12) United States Patent
Sill (10) Patent No.: US 11,345,022 B2
(45) Date of Patent: May 31, 2022

(54) COLLAPSIBLE, MULTIPLE AXIS CARTESIAN ROBOT

(71) Applicant: Kkrane, LLC, Forest, VA (US)

(72) Inventor: Gary Sill, Forest, VA (US)

(73) Assignee: Kkrane, LLC, Forest, VA (US)

( * ) Notice: Subject to any disclaimer, the term of this patent is extended or adjusted under 35 U.S.C. 154(b) by 372 days.

(21) Appl. No.: 16/745,444

(22) Filed: Jan. 17, 2020

(65) Prior Publication Data

US 2020/0230807 A1 Jul. 23, 2020

Related U.S. Application Data

(60) Provisional application No. 62/794,046, filed on Jan. 18, 2019.

(51) Int. Cl.
| | |
|---|---|
| *B25J 9/02* | (2006.01) |
| *B25J 9/12* | (2006.01) |
| *B25J 17/02* | (2006.01) |
| *B25J 5/00* | (2006.01) |

(52) U.S. Cl.
CPC ............... *B25J 9/023* (2013.01); *B25J 9/12* (2013.01); *B25J 17/025* (2013.01); *B25J 5/007* (2013.01)

(58) Field of Classification Search
CPC ... B25J 5/007; B25J 17/025; B25J 9/12; B25J 9/023
See application file for complete search history.

*Primary Examiner* — Randell J Krug
(74) *Attorney, Agent, or Firm* — John H. Thomas, P.C.

(57) ABSTRACT

A collapsible, versatile, multiple axis Cartesian robot system is aimed directly at solving the issue of the inverse relationship of robot portability to workspace volume. The collapsible, multiple axis Cartesian robot, minimizes the collapsed size of the robot while maximizing the workspace volume in the use of multiple, alternating linear and rotary actuators.

20 Claims, 9 Drawing Sheets

COLLAPSIBLE, MULTIPLE AXIS CARTESIAN ROBOT

This application claims the benefit of filing of U.S. Provisional Patent App. No. 62/794,046, filed Jan. 18, 2019, incorporated by reference herein in its entirety.

The invention relates to the field of Cartesian robots. Specifically, the Cartesian robot described herein can be folded so that the space envelope of the folded robot is very small relative to the working envelope of the robot when it is unfolded.

BACKGROUND

Cartesian robots are commonly used in industry for executing a variety of tasks from moving and assembling products to dispensing adhesives and installing screws. Cartesian robots are also applied to many machining processes and more recently to additive manufacturing processes.

A challenge of existing Cartesian robot systems is the amount of space that they occupy. Moreover, the active working envelope of these robots is relatively small as compared with the space envelope taken up by the device itself. While this may be entirely suitable for custom-engineered applications, these designs are not reasonably portable and are not able to cover a large work area.

SUMMARY

Accordingly, it is an object of the present invention to overcome the existing constraints and limitations of existing Cartesian robots. The robot described herein is designed to be portable and movable in some examples. Also, it is designed to be folded into a collapsed state that is relatively compact, at least as compared with the working envelope that the robot is designed to work in.

The linear slide mechanisms which make up the X, Y and Z axis of the robot described herein can be folded in such a way that the space envelope of the folded or collapsed robot is very small relative to the working envelope of the robot when it is unfolded. This ratio of work envelope to the folded envelope is greater than 50 to 1. In other embodiments, this invention could have a ratio greater than 100 to 1. This invention concerns Cartesian robots with a work envelope to folded robot envelope of greater than 5 to 1, or alternatively greater than 10 to 1, or still further alternatively greater than 20 to 1. Most common Cartesian robots have a ratio of less than 1 to 1. An additional unique feature of the robots described herein is that the outriggers or robot support elements are movable, active, and may be attached to various stages of the robot which allows these outriggers to be placed in optimal positions, thereby improving the rigidity of the robot.

In one example, a Cartesian robot comprises a base having a base mount attached to the base, and a plurality of actuators attached to the base. A first actuator comprises a first linear actuator having a first actuator fixed piece attached directly to the base, and a first actuator moving piece movably attached to the first actuator fixed piece, and having a first direction of travel parallel to a length of the base, and wherein the first actuator has a first collapsed position where the base and the first actuator do not extend beyond each other in opposing directions along the first direction of travel. A second actuator comprises a second rotary actuator having a second actuator fixed piece rotatably attached directly to the first actuator moving piece, and a second actuator moving piece, wherein the second actuator is movable between a second collapsed position adjacent the first actuator moving piece and a second open position oriented perpendicular to the first direction of travel. A third actuator comprises a third linear actuator having a third actuator fixed piece attached directly to the second actuator moving piece, and a third actuator moving piece, wherein the third actuator moving piece is movable in a third direction of travel that is oriented perpendicular to the first direction of travel when the second actuator moving piece is in the second open position. A fourth actuator comprises a fourth rotary actuator having a fourth actuator fixed piece rotatably attached directly to the third actuator moving piece, and a fourth actuator moving piece, wherein the fourth actuator is movable between a fourth collapsed position adjacent the third actuator moving piece and a fourth open position oriented perpendicular to the third direction of travel. A fifth actuator comprises a fifth linear actuator having a fifth actuator fixed piece attached directly to the fourth actuator moving piece, and a fifth actuator moving piece, wherein the fifth actuator moving piece is movable in a fifth direction of travel that is oriented perpendicular to the first direction of travel and perpendicular to the third direction of travel when the second actuator moving piece is in the second open position and the fourth actuator moving piece is in the open position. A sixth actuator comprises a sixth rotary actuator having a sixth actuator fixed piece rotatably attached directly to the fifth actuator moving piece, and a sixth actuator moving piece, wherein the sixth actuator is movable between a sixth collapsed position adjacent the fifth actuator moving piece and a sixth open position oriented perpendicular to the third direction of travel and parallel to the first direction of travel. And a seventh actuator comprises a seventh linear actuator having a seventh actuator fixed piece attached directly to the sixth actuator moving piece, and a seventh actuator moving piece, wherein the seventh actuator moving piece is movable in a seventh direction of travel that is oriented perpendicular to the sixth direction of travel and perpendicular to the third direction of travel when the second actuator moving piece is in the second open position and the fourth actuator moving piece is in the open position. Optionally, the robot may further comprise an eighth actuator comprising an eighth rotary actuator having an eighth actuator fixed piece attached directly to the seventh actuator moving piece, and an eighth actuator moving piece, wherein the eighth actuator is oriented perpendicular to the seventh direction of travel, and a tool connected to the eighth actuator. The base may be fixed to a foundation. The base may be adapted to move while the robot is in use. The base may be adapted to move between robot operations. The robot may further comprise outriggers actively attached to one of the plurality of actuators. Alternatively, a plurality of outriggers may be actively attached to a plurality of actuators. The third actuator may have a top side and a bottom side as oriented on the perpendicular ends of the third actuator, and a support wheel mounted on the bottom of the third actuator. The space envelope of the fully collapsed robot relative to the working envelope of the robot when it is fully unfolded is greater than 100 to 1, or alternatively greater than 50 to 1, or still further alternatively greater than 20 to 1, or still further alternatively greater than 10 to 1, or still further alternatively greater than 5 to 1, or still further alternatively greater than 1 to 1, wherein the space envelope of the fully collapsed robot is measured when the second, fourth and sixth rotary actuators are fully folded so that the first, third, fifth and seventh linear actuators are parallel with each other such that the robot is contained in its entirety within the bounds of a smallest possible rectangular cuboid, and wherein the working envelope is the area which can be reached by the robot for the purpose of doing work when the second, fourth and sixth rotary actuators are oriented such that the third, fifth and seventh directions of travel are perpendicular to each other. Outriggers may be attached to the fixed piece of the third actuator, whereby the outriggers provide supplemental support to the third actuator. The tool attached to the eighth actuator may be a nozzle for use in dispensing material. A movement of one of the first, second, third, fourth, fifth, sixth, seventh, or eighth actuators may be initiated by an electric motor. A computer control may be operatively connected to the electric motor. A movement of a plurality of the first, second, third, fourth, fifth, sixth, seventh, or eighth actuators may be initiated by a plurality of electric motors, and a computer control operatively connected to the plurality of electric motors. The tool may comprise an offset nozzle that places an end of the offset nozzle outside of a vertical profile of the actuators.

DETAILED DESCRIPTION

This robot described herein consists of a base and a specific combination of rotary and linear actuators mounted onto and attached to each other in such a way as to make this robot unique in its ability to fold or collapse into a small package relative to its potential work envelope. To further increase the working envelope of this robot, the first linear actuator functions as an extension of the base, increasing one axis by the length of the travel of the first actuator. An additional improvement offered by this invention is the outriggers or robot support legs which are unique because they fold into the robot's base.

Because of the use of these terms throughout, the definitions of linear and rotary actuators are important. The term "rotary actuator" as used herein refers to a mechanism which has two primary elements which comprise a single unit, the rotary actuator. The primary elements are the base or "fixed piece" of each rotary actuator, and the "moving piece". The axis of rotation of each rotary actuator will be designated in the drawings. The term "linear actuator" as used herein refers to a mechanism which has two or three primary elements which comprise a single unit, the linear actuator. These elements include the base or "fixed piece" of each linear actuator, the "moving piece," and the piece or pieces between the fixed and moving pieces. The direction of travel will be designated in the drawings. The linear actuators described herein may or may not incorporate one or more intermediate pieces. Each linear actuator may be simple, telescopic, or any other form.

As is evident in the foregoing, the actuators are defined primarily by their respective fixed and moving pieces. This movement of the pieces relative to each other may be accomplished manually or with some type of motorized device. These specific motors, cables, pulleys, or other components are not shown in the drawings. In one example, electronic motors move the respective pieces relative to one another. These electronic motors are operationally connected to a computer processor that controls the relative movement. While each motor may be operated separately and manually, it is believed that more careful control may be obtained by computer control of operation. Alternatively, one or more of the actuators may be operated manually while others are operated electronically, for instance by computer control. These motors may or may not be integral in the fixed and moving pieces of the actuators, so they are not shown in the drawings.

It may be desirable to lock certain elements of any one or more actuators in place in order to make the robot more rigid. In one example, each of the folding rotary actuators may be locked. In another example all of the actuators may be locked except for the actuator or actuators currently in use. The locking and unlocking of the actuators may be computer controlled and their operation may be integrated with the operation of the other actuators.

In one example, motion of first and third linear actuator may be carried out by electric motor driven pinions engaged in a gear rack with the second, fourth, and sixth rotary actuators being manually driven and locked into their operating positions with bolts. The fifth, seventh, and eighth linear actuators could be controlled by a computer via servo motors and belt drive systems. Other examples include the application of other combinations of driving and locking methods for each axis of motion. Additionally, any of the methods of driving and locking the axes may be controlled by computer or any other means.

Turning now to the drawings, an example of the robot and its plurality of actuators will be illustrated and discussed. The order and operation of each of the actuators is important, however, it may hypothetically be varied in small degrees. The specific order shown here is able to be fully folded to achieve a relatively small space envelope and compared with the robot's working envelope.

Figure 1:
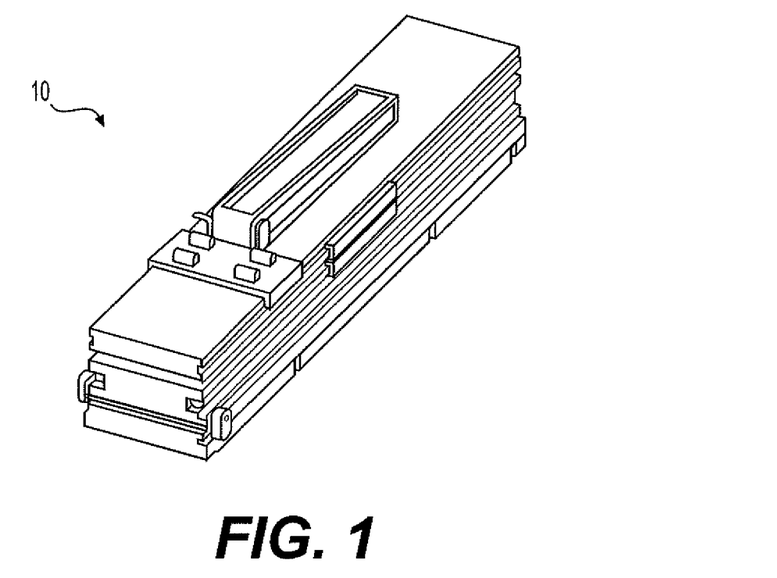
FIG. 1 is a perspective view of an example of a fully collapsed or folded Cartesian robot as described herein.
Figure 2:
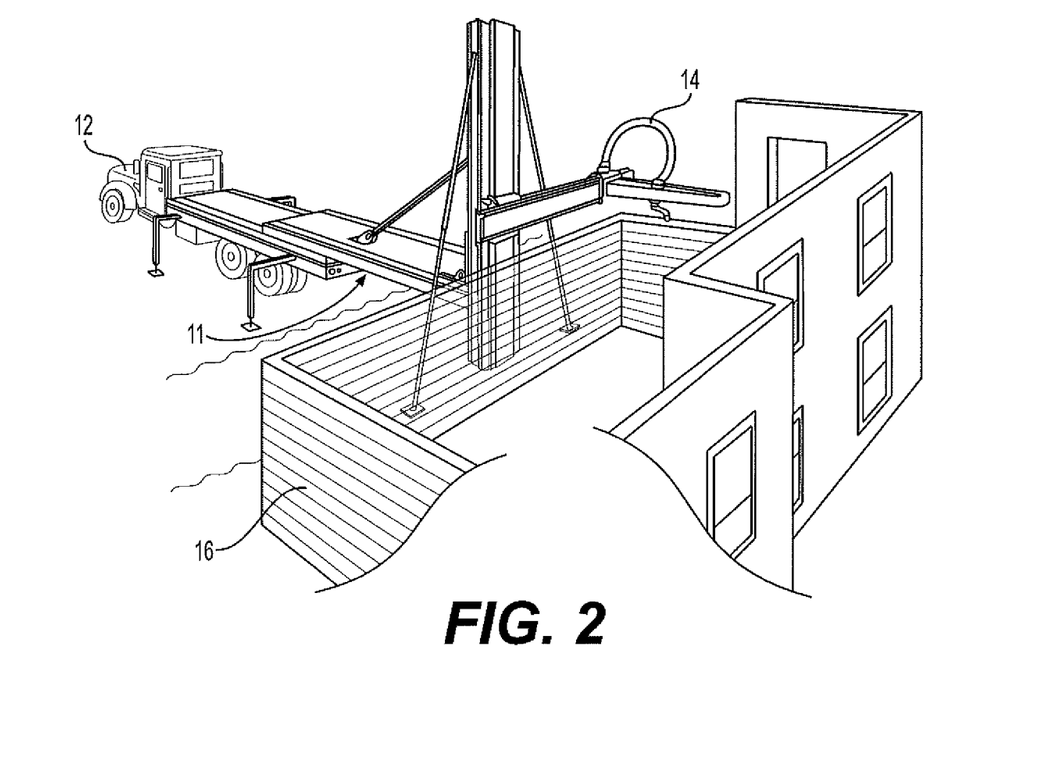
FIG. 2 is a perspective view of an example of a fully unfolded Cartesian robot as described herein.

FIGS. 1 and 2 illustrate a fully collapsed or folded robot 10 in FIG. 1 that occupies a relatively small space envelope as compared with a completely unfolded robot 11 that is the same as robot 10 in FIG. 1 but for the unfolded and folded states respectively. FIG. 2 is just one example of a relatively large robot 11 that is mounted onto and able to be transported by truck 12. In FIG. 2, the tool 14 is a concrete pump and nozzle system that is laying concrete to build the wall 16 as shown. There are of course numerous additional work applications and relative sizes of a Cartesian robot as described herein. The following figures describe in more detail the robot 10 in its single condition as seen in FIG. 1 without any truck or other transporter of the robot. The figures in order beginning with the base will describe the various components and actuators and how they work and move relative to one another.

Figure 3:
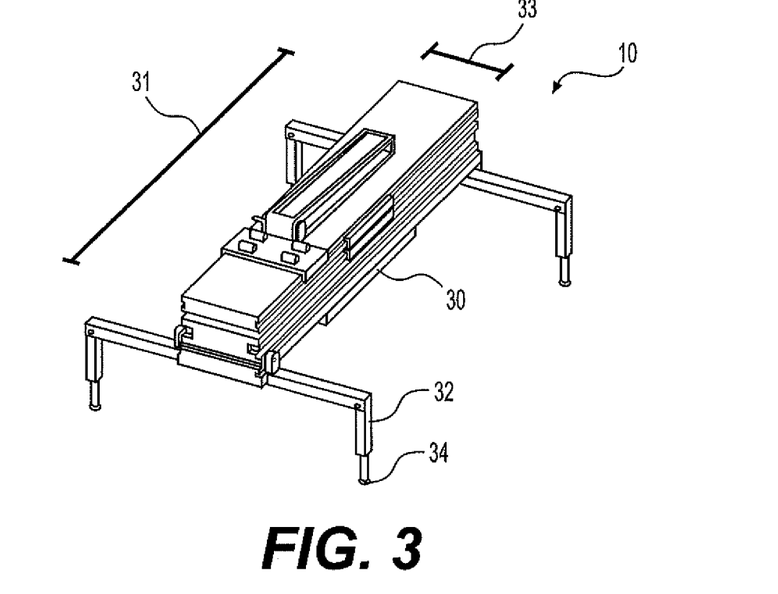
FIG. 3 is a perspective view of a Cartesian robot as described herein especially showing an example of a base and base mount structure.

Base:

FIG. 3 illustrates the entire robot 10. The robot 10 is built upon a base 30. The base 30 is the foundational portion of the robot 10 to which other moving components are attached. Relative to the components attached to the base 30, the base will be considered stationary, though the base itself will in some configurations be in motion or mobile. The base 30 may be of nearly any shape, however, for the purpose of explanation it will be defined herein as having a length 31 and a width 33 each of these aspects being perpendicular to the other two. Depending on the application, the base 30 may be oriented in any direction. In this example only, the base 30 is rectangular in shape. In FIG. 3, the base 30 is shown with its base mount 32 and mounting mechanism 34, shown in their open or deployed positions. The mount 32 and mounting mechanism 34 are discussed more fully as follows.

Base Mount:

The base mount 32 is the element of the system which is used to secure the base 30 to a foundation and may consist of one or more of many configurations. The base mount 32 may provide for the leveling and or aligning of the base 30 to the ground or to any other reference. This leveling and or alignment means may be manual, automatic, or any combination thereof. Base mount 32 configurations fall into three general categories—fixed, moving, and movable.

1. Fixed—A fixed base mount is a base mount that is directly secured or "fixed", whether temporarily or permanently, to any foundation such as, but not limited to, the ground in any form (under water or on land), a plant or any part thereof such as a tree, a human or animal or any part thereof, a concrete pad, a wood or other pad, a building or any part thereof, a framework, piping, a leg or legs, a tank, or any other body or structure.
2. Moving—A moving base mount allows the base to move while the robot is in use, or between robot operations. The moving base mount may consist of but is not be limited to one or more of the following configurations individually or combined: wheeled, tracked, linear rail, rotary actuator, and legged.
3. Movable—A movable base mount allows the base to be moved during transport of the robot from one location to another and then to be temporarily fixed while in use. As with the fixed mount base, the movable base mount may, once transported to the location where it will be used, be directly secured or "fixed", whether temporarily or permanently, to any foundation such as the following: the ground in any form (under water or on land), a plant or any part thereof such as a tree, a human or animal or any part thereof, a concrete, wood, or other pad, a building or any part thereof, a framework, piping, a leg or legs, a tank, or any other body or structure. The means by which a movable base may be moved or transported consists of, but is not limited to, the following individually or combined: a wheeled, tracked, flying, floating, or swimming (submersible) vehicle, or a catheter.

FIG. 2 illustrates a movable base, while FIG. 3 illustrates a fixed base. Although, as described, the fixed based shown in FIG. 3 can be placed onto a truck and become movable as shown in FIG. 2.

Base Mounting Mechanism

The base mounting mechanism 34 shown in FIG. 2 may be used to temporarily or permanently secure the robot base 30. The base mounting mechanism 34 consists of, but is not limited to, the following individually or combined: gravity, welds, rivets, adhesive whether taped, glued, or by other means, magnets, springs, weights, cables, chains, outriggers, bolts or screws, hook and loop fasteners or any variant thereof, nails, hooks of any shape or variation, skewers, and smooth, soft, toothed, treaded, textured or contoured friction surfaces.

Figure 4:
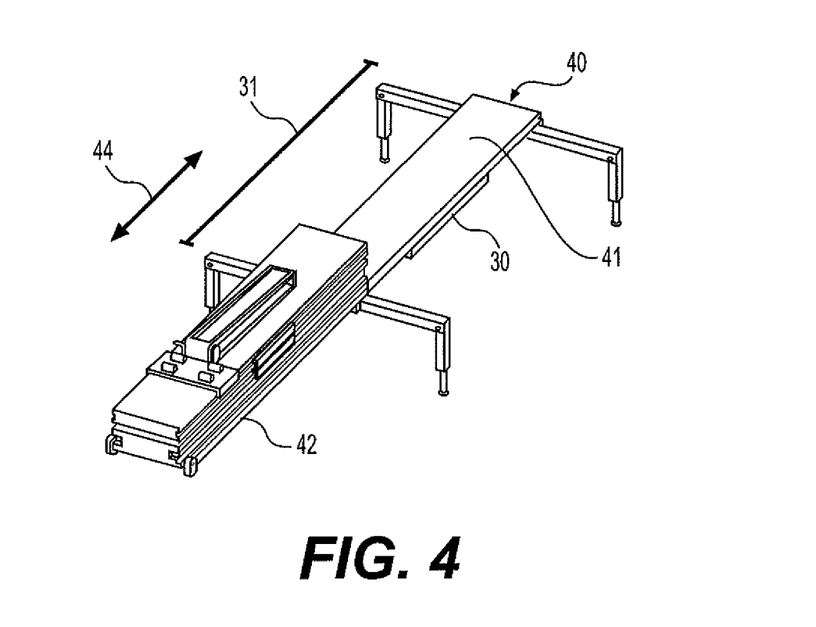
FIG. 4 is a perspective view of a Cartesian robot as described herein especially showing an example of a first linear actuator.

First Actuator (Linear Actuator)—FIG. 4

The first actuator 40 is a linear actuator. The first actuator 40 includes a first actuator fixed piece 41 that is connected directly to or fully integrated with the base 30. The first actuator 40 also includes a first actuator moving piece 42. The direction of travel 44 of the first actuator moving piece 42 is parallel with the length 31 of the base 30. The first actuator 40 may extend in one or two directions relative to its collapsed position (e.g., FIG. 3) which is a position wherein first actuator and the base 30 do not extend beyond each other in opposing directions along the direction of travel 44 of the first actuator moving piece 42.

Figure 5:
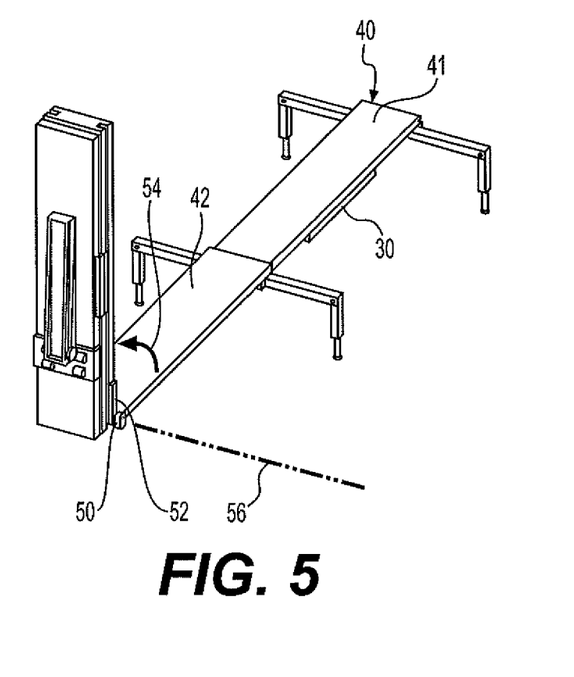
FIG. 5 is a perspective view of a Cartesian robot as described herein especially showing an example of a second folding rotary actuator.

Second Actuator (Folding Rotary Actuator)—FIG. 5

The second actuator 50 is a rotary actuator. The second actuator fixed piece 42 of the second actuator 50 is connected directly to or as shown is fully integrated with the first moving piece 42 of the first actuator 40. Therefore, the first actuator moving piece 42 and the second actuator fixed piece 42 are given the same item number. The axis of rotation 56 of the second actuator 50 is oriented perpendicular to direction of travel 44 of the first actuator 40. The second actuator moving piece 52 moves in a rotating direction 54.

Figure 6:
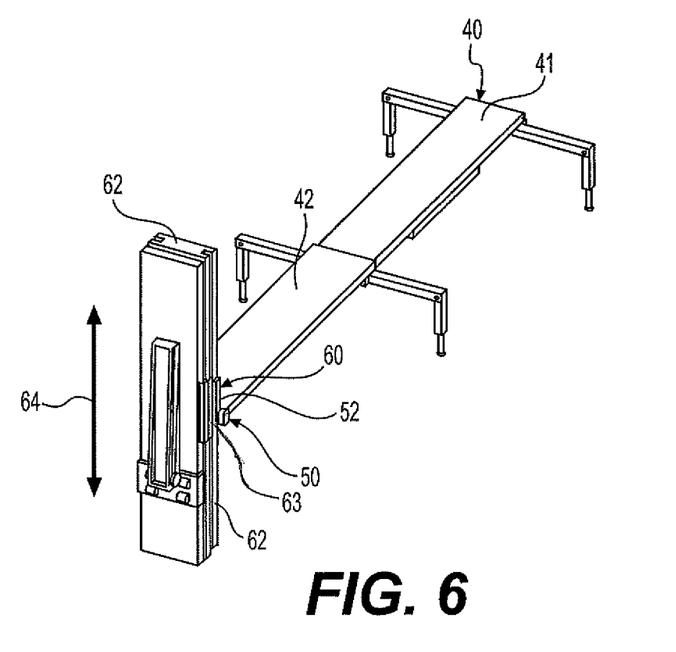
FIG. 6 is a perspective view of a Cartesian robot as described herein especially showing an example of a third linear actuator.

Third Actuator (Linear Actuator)—FIG. 6

The third actuator 60 is a telescopic linear actuator. The third actuator fixed piece 52 of the third actuator 60 is connected directly to or as shown fully integrated with the second actuator moving piece 52 of the second actuator 50, hence the second actuator moving piece and third actuator fixed piece share the same item number. The direction of travel 64 of the third actuator moving pieces 62 and 63 are oriented perpendicular to the axis of rotation 56 of the second actuator 50.

Figure 7A:
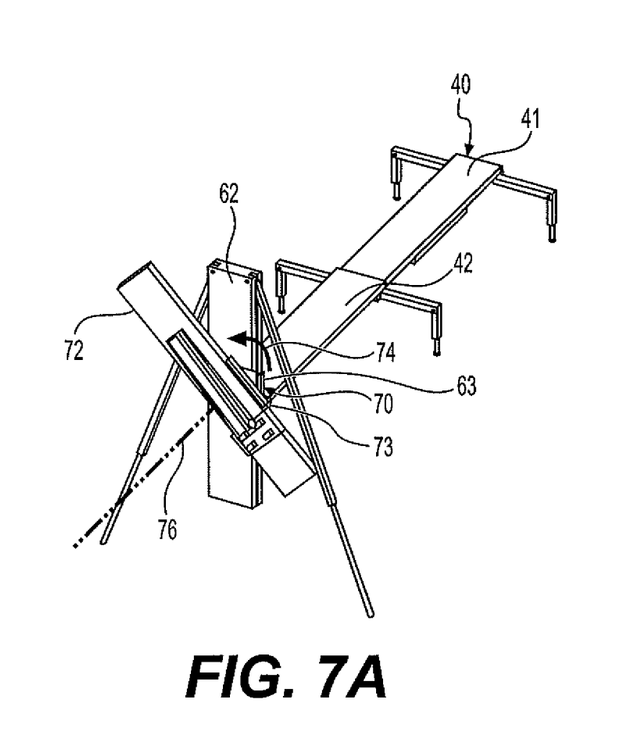
FIGS. 7A and 7B are perspective views of a Cartesian robot as described herein especially showing an example of a fourth folding rotary actuator in the halfway and fully open positions respectively.
Figure 7B:
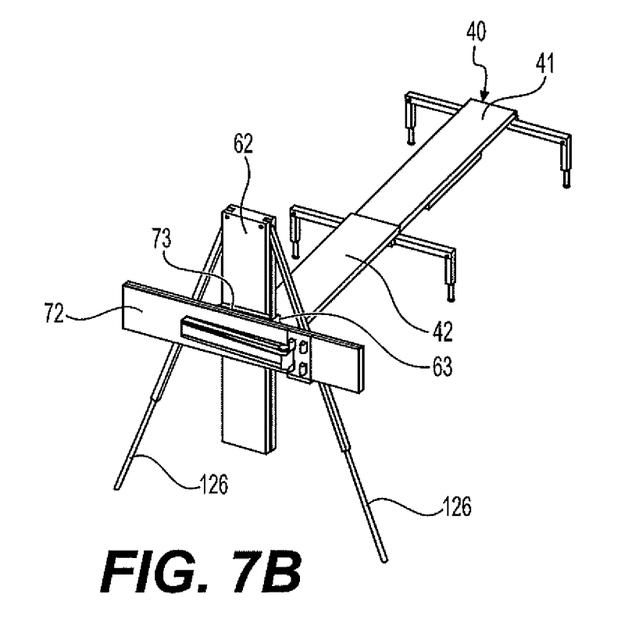

Fourth Actuator (Folding Rotary)—FIGS. 7A and 7B

The fourth actuator 70 is a rotary actuator. The fourth actuator fixed piece 62 of the fourth actuator 70 is connected directly to or fully integrated with the third actuator moving piece 63 of the third actuator 60 such that they share the same item number. The axis of rotation 76 of the fourth actuator 70 is oriented perpendicular to direction of travel 64 of the third actuator 60. In FIG. 7A, the fourth actuator moving piece 73 is shown rotating in direction 74 from the position as shown in FIG. 6 to the position as shown in FIG. 7B.

Figure 8:
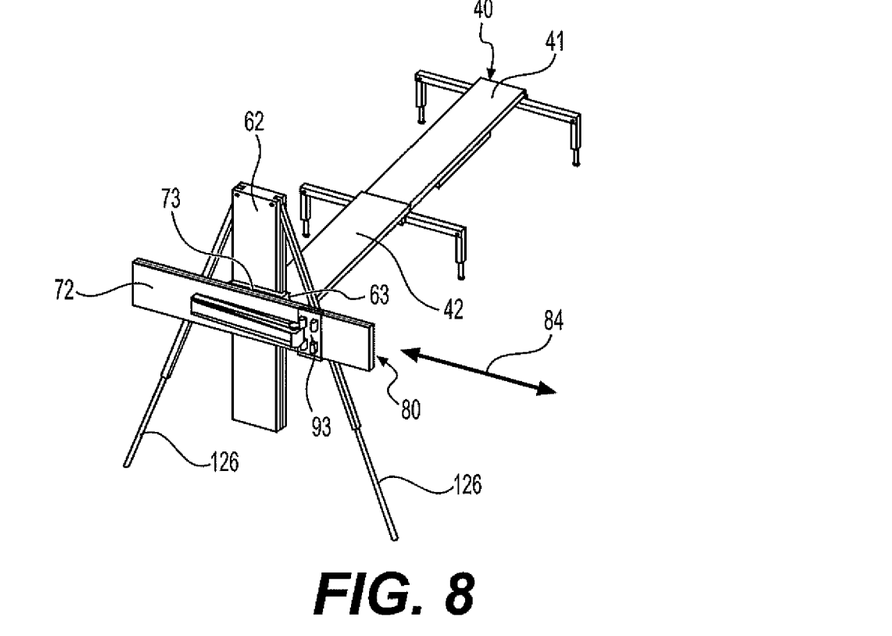
FIG. 8 is a perspective view of a Cartesian robot as described herein especially showing an example of a fifth linear actuator.

Fifth Actuator (Linear)—FIG. 8

The fifth actuator 80 is a telescopic linear actuator. The fifth actuator fixed piece 73 of the fifth actuator 80 is connected directly to or fully integrated with the fourth actuator moving piece 73 of the fourth actuator 70. The direction of travel 84 of the fifth actuator 80 is oriented perpendicular to of the axis of rotation 76 of the fourth actuator moving piece 73 and shares the same item number as the fifth actuator fixed piece 73. The fifth actuator moving pieces 72 and 93 move linearly in direction 84 along fifth actuator fixed piece 73 (the same as the fourth actuator moving piece 73).

Figure 9:
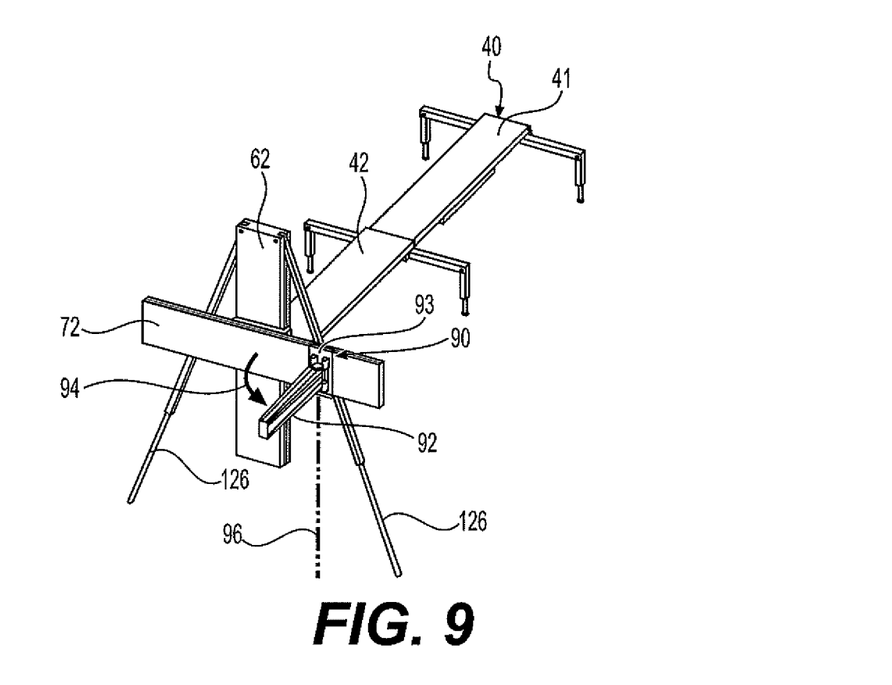
FIG. 9 is a perspective view of a Cartesian robot as described herein especially showing an example of a sixth folding rotary actuator.

Sixth Actuator (Folding Rotary)—FIG. 9

The sixth actuator 90 is a rotary actuator. The sixth actuator fixed piece 93 of the sixth actuator 90 is connected directly to or fully integrated with and shares the same item number as the fifth actuator moving piece 93 of the fifth actuator 80. The axis of rotation 96 of the sixth actuator 90 is oriented perpendicular to the direction of travel 84 of the fifth actuator. Arrow 94 shows the direction of movement of sixth actuator moving piece 92.

Figure 10:
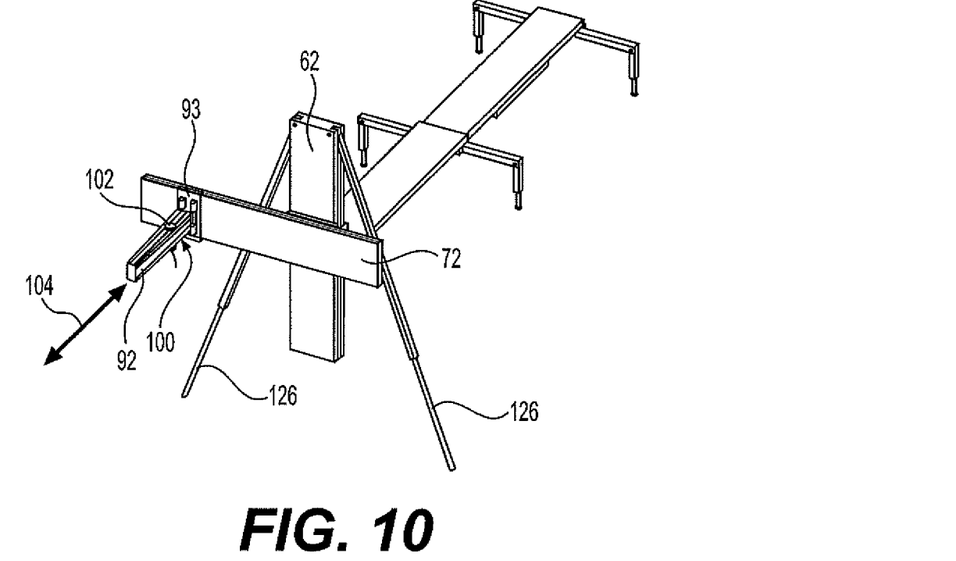
FIG. 10 is a perspective view of a Cartesian robot as described herein especially showing an example of a seventh linear actuator.

Seventh Actuator (Linear)—FIG. 10

The seventh actuator 100 is a linear actuator. The seventh actuator fixed piece 92 of the seventh actuator 100 is connected directly to the sixth actuator moving piece 92 of the sixth actuator 90. The direction of travel 104 of the seventh actuator 100 is oriented perpendicular to the axis of rotation 96 of the sixth actuator 90. Seventh actuator moving piece 102 moves along the length of sixth actuator moving piece 92.

Figure 11:
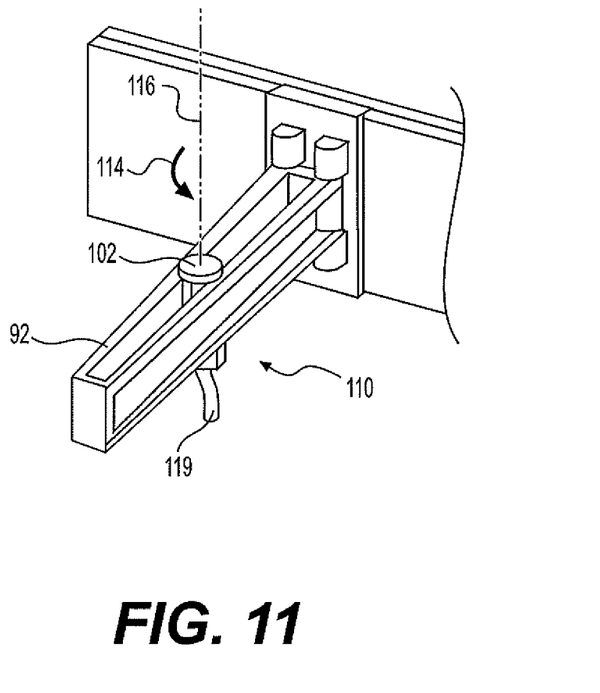
FIG. 11 is a perspective view of a Cartesian robot as described herein especially showing an example of an eighth rotary actuator.

Eighth Actuator (Rotary)—FIG. 11

The eighth actuator 110 is a rotary actuator. The eighth actuator fixed piece 102 of the eighth actuator 110 is connected directly to or fully integrated with the seventh actuator moving piece 102 of the seventh actuator 100, hence the same item number for each. The axis of rotation 116 of the eighth actuator moving piece 118 is oriented perpendicular to direction of travel 104 of the seventh actuator 100. The robot's end effector 119 is an end of arm tooling, or any other tool, that is mounted to the eighth actuator moving piece 118 of the eighth actuator 110.

The Collapsed or "Stored" State

The robot is considered to be collapsed when it is folded, by means of its folding rotary actuators, such that the direction of travel of all of the first, third, fifth and seventh linear actuators (40, 60, 80 and 100 respectively) are parallel with each other and all of the linear actuators (40, 60, 80 and 100) are positioned, and the mounting apparatus is arranged, such that the robot is contained in its entirety within the bounds of the smallest possible rectangular cuboid. See FIG. 1.

The Unfolded or "Ready" State

The robot is considered to be in its fully unfolded state when the second, fourth and sixth folding rotary actuators (50, 70 and 90 respectively) are oriented such that directions of travel 64, 84, and 104 of the third, fifth and seventh linear actuators (60, 80 and 100) are perpendicular to each other. See, e.g., FIG. 2.

Working Envelope

Figure 12:
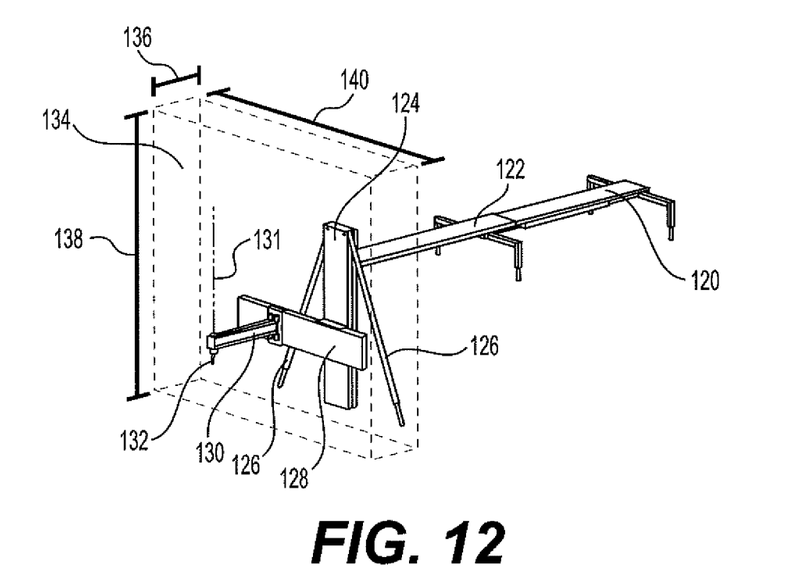
FIG. 12 is a perspective view of an unfolded Cartesian robot illustrating a portion of the working envelope of the robot.

The working envelope is the area/volume which can be reached by the robot for the purpose of doing work. One use of the embodiment shown herein is for the purpose of additive manufacturing wherein the applied tool is a nozzle which dispenses a material to be 3D printed. In this application, the 3D printing process would be started in Zone 1 (134) as depicted in FIG. 12. Zone 1 (134) is a cuboid volume defined by height 138, width 140, and depth 136. Zone 1 (134) represents the volume accessible to the tool 132 as it moves rotationally about axis 131, which is movable linearly along arm 130, which is movable linearly along horizontal piece 128, which is movable up and down vertical piece 124, which is itself movable up and down.

Figure 13:
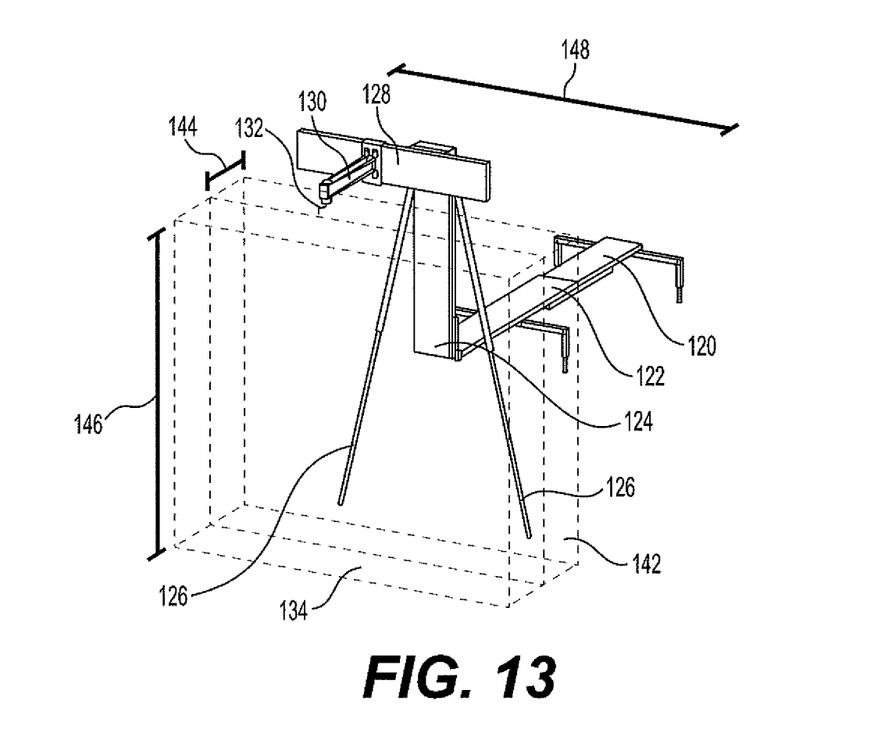
FIG. 13 is a perspective view of an unfolded Cartesian robot illustrating an additional portion of the working envelope of the robot.

After the 3D printing process is completed in Zone 1 (134), the horizontal first moving piece 122 is retracted on first fixed piece 120 by the depth 136 of Zone 1 and printing would begin in Zone 2 (142) as shown in FIG. 13. Zone 2 (142) has a height 146, width 148, and depth 144. Zone 2 (142) is identical in size and directly adjacent Zone 1 (134). As shown in FIG. 13, the tool 132 on arm 130 are in a higher vertical position on third moving piece 124 than in FIG. 12, which is itself in a higher position relative to first moving piece 122, thereby demonstrating an example of the scope of movement of the overall robot.

As printing is completed in a zone, printing would continue in each successive zone as the first moving piece 122 is retracted back over first fixed piece 120. In this application the first moving piece 122 would be retracted the distance of the depth of the most recently printed zone thus making the currently printed zone fully accessible to a tool mounted on the robot.

Figure 14:
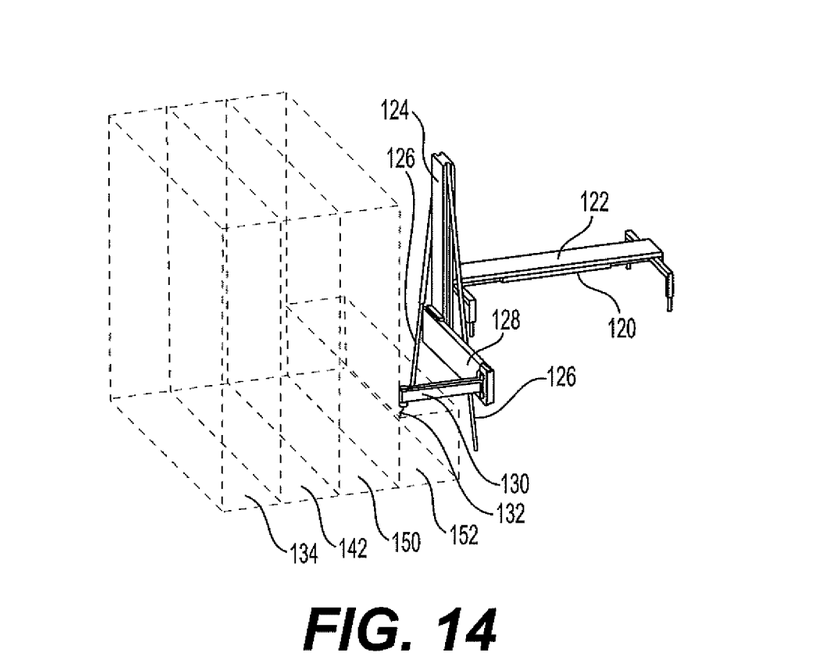
FIG. 14 is a perspective view of an unfolded Cartesian robot illustrating a still further portion of the working envelope of the robot.

FIG. 14 illustrates four zones 134, 142, 150, and 152 that are all accessible to the tool 132 based on the retraction of the first moving piece 122 over first fixed piece 120.

Nozzle Configuration and Actuation

Figure 15:
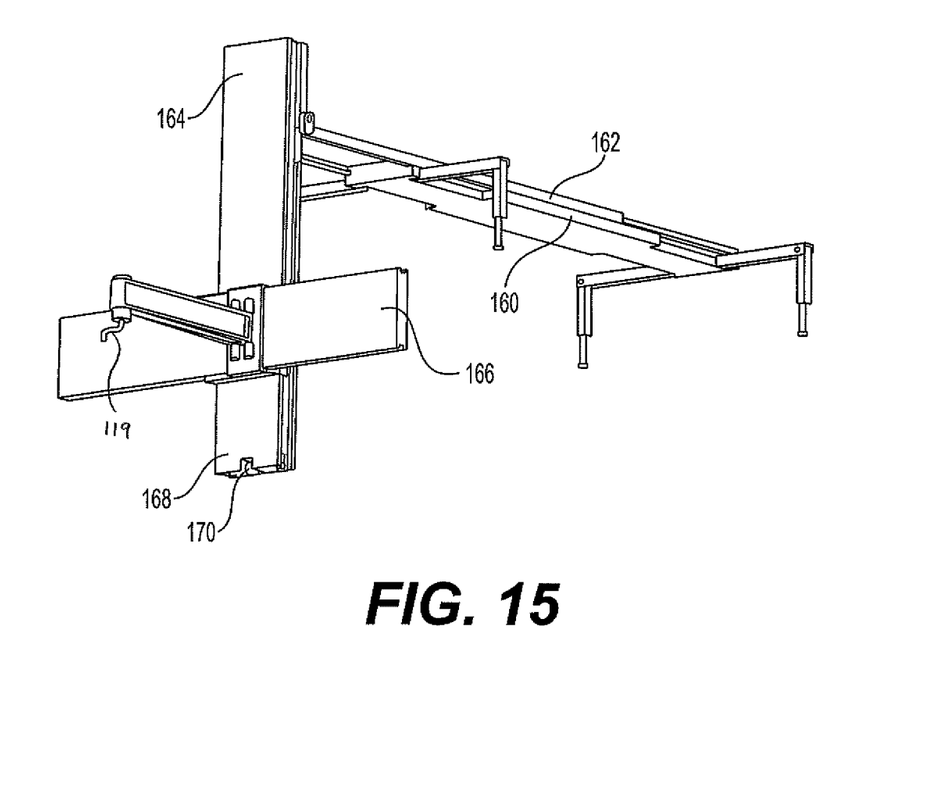
FIG. 15 is a perspective view of an example of a fully unfolded Cartesian robot as described herein illustrating a support wheel feature.
Figure 16A:
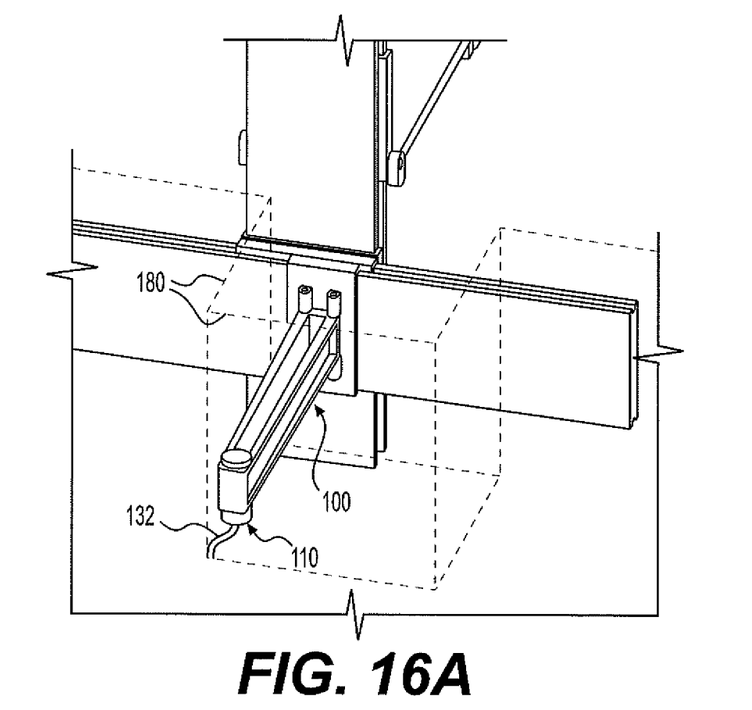
FIGS. 16A and 16B are perspective and top views respectively of the seventh and eighth actuators of a robot with an offset nozzle installed on the eighth actuator.
Figure 16B:
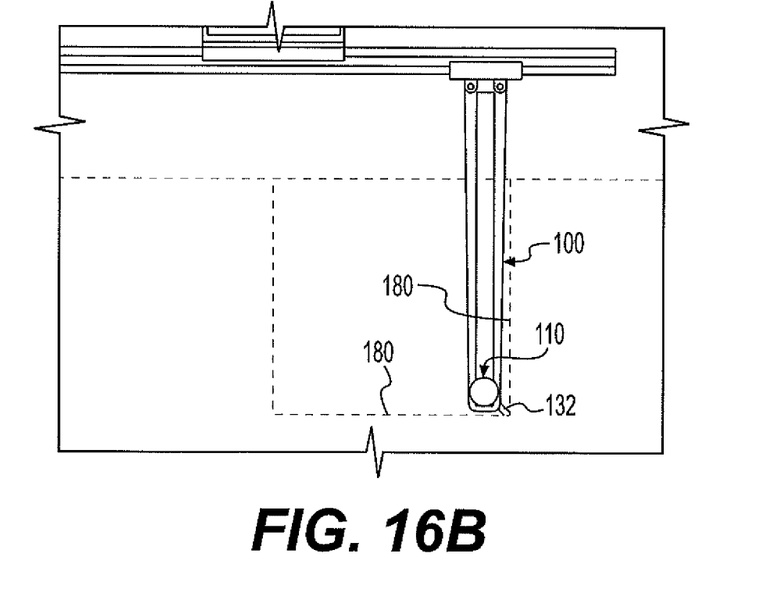

An additional feature herein relates to the shape and configuration of the tool 132 in the shape of a nozzle as shown in FIGS. 16A and 16B. The tool/nozzle 132, when mounted to the cantilevered Seventh Actuator 100 and the Rotational Eighth Actuator 110, provides a means by which the nozzle can be moved to positions which allow material to be dispensed against immediately adjacent existing material 180 without the Seventh Actuator or Eighth Actuator coming in contact with the existing material. The tool/nozzle 132 is shown with a double curve dogleg shape so that the end of the nozzle is offset outside of the vertical profile of the Seventh Actuator 100 and Eighth Actuator 110 as shown in the top view of FIG. 16B. The shape and geometry of a nozzle could alternatively be movable in offset positions such as an angled straight line or some alternative shape that places the end of a nozzle outside of the vertical profile of the actuators. The tool/nozzle 132 may extend from the center of the bottom of the Eighth Actuator 110 as shown, or it may alternatively be fixed to and mounted elsewhere on the bottom of the Eighth Actuator or out a side of the Eighth Actuator. These alternative positions for the tool/nozzle 119 and 132 are readily able to be understood with reference to FIGS. 11, 15 and 16A and 16B.

Support Wheel and Outriggers

Looking now at FIG. 15, as the first actuator moving piece 162 is extended or retracted over first actuator fixed piece 160, it is possible that the load on the bearing surfaces of the first actuator moving piece and first actuator fixed piece will become heavily loaded. It is also possible that the base could tip. A support wheel 170 mounted on the bottom 168 of the third actuator moving piece 164 would allow the first actuator moving piece 162 to extend or retract without tipping or bearing overload. Before extending or retracting the first moving piece 162, the third actuator moving piece 164 would be extended to bring the wheel 170 in contact with the ground or other surface on which the load of the system could be supported.

FIGS. 7A, 7B, 8, 9, 10, 12, 13, and 14 also display second outriggers 126 that are connected to third actuator moving piece 124 (in FIGS. 12, 13 and 14) and third actuator moving piece 62 (in FIGS. 7A, 7B, 8, 9, and 10) that provide lateral support to the third actuator moving piece. The outriggers 126 are extendible and retractable as required and in coordination with the up and down movement of the third moving piece 124 (or 62). Depending on a foundation over which the robot is used, the outriggers 126 on each side of the third moving piece 124 may be different lengths to account for an uneven foundation. For instance, the outriggers 126 are almost fully retracted in FIG. 12 and almost fully extended in FIG. 13. The outriggers 126 will nest in the sides of the third moving piece 124 when not in use.

General Information

The methods by which motion is initiated will now be discussed. The design of the mechanism by which the robot functions is straightforward but there are a variety of methods by which the robot components can be animated. Electric motors (such as servos) can be employed for fine-tuned movement of the robot. This is useful in small-scale applications where movement must be kept precise and controlled to a tight tolerance. Hydraulics may be used for the robot movements that do not need to be kept as precise, such as the tipping of the Z axis boom or the swinging into position of the Y axis boom. Pneumatics may be used to provide control for manipulators or end-of-arm tooling that may be used by the robot. Motive methods are not limited to the previously mentioned methods, but can be induced by steam power, combustion engine, gravity, wind, manually (by human), or a hybrid combination of any of these methods.

The methods by which actuation of the movement of the robot is executed are equally as broad. Actuation can be executed by chain drive, belt drive, rack and pinion mechanisms, friction wheels, direct drive, gear drive, through the use of gear reduction methods or gearboxes, by way of a screw mechanism, or any combination of these methods. Motion inducement can include but is not limited to the previously listed power transmission methods.

Robot movement and motion control is applied to ensure the robot can be used in whatever application it is introduced. Motion control can be performed in a variety of ways. Manually, through use of servos, automatically, computer controlled, or a hybrid combination of these systems. Manual adjustment can be performed by using a joystick to guide the robot, positions or coordinates (global or local) entered on a user interface screen or other method, individual switches such as those found in remote control hobby airplanes and vehicles, push buttons, a lever, or a tether pendent such as those used in robot programming. Servo control would be used where the different axes of travel can have a feedback loop, or feedback can occur for a combination of the axis movement. Automatic control can occur where the robot performs pre-programmed functions in response to feedback gained by analysis of the surrounding environment. This would remove the responsibility of the user to monitor every aspect of the robots' functions as the robot would perform self-correction based on situational variables. This feedback would be generated in response to analysis of speed, position, and temperature of the robot and elements of the environment. Computer control of the robot can be performed by signals output from a central control box, and would be crucial when using systems or networks of robots (similar and dissimilar), as it would be necessary for the robots to interface and cooperate with other robots. Computer control would also consist of the code generated from a software program resulting from user inputs on a human-machine-interface screen. This software would allow the user to select simple building block commands (with each command containing different configurations or options), and combine these commands together to accomplish the users' goal. A hybrid controller can be made by combining the previously described elements to affect the operation, motion, or function of the system. The hybrid controller can contain some or all of these elements, but is not limited to the previously described elements.

A further design element in the multiple axis collapsible robot system described herein is the portability element. The nature of the design of this robot is to minimize the collapsed size of the robot while maximizing the extents to which the robot can reach and operate. Some of the methods by which this robot can be transported are by mobile trailer, railcar, boat, or the system can remain fixed and the surroundings have mobile elements. The robot base can be mounted onto a mobile truck or trailer so that after transportation, the robot and vehicle can be parked in position. A method of transportation such as a railcar can be used where the robot can be mounted to a vehicle which follows a track. The track can allow the vehicle to travel at a constant speed or make intermittent movements to allow the robot to complete a variety of tasks during the course of a movement operation. The robot can also be positioned on a board, or floating raft, so that it can perform water-based applications. The applications and methods by which the robot can be transported are not limited to the previously mentioned means of transport. The last state in which the robot can exist is the temporarily secured, stationary state. The robot can be fixed in place, and objects around the robot can be in motion (conveyors, product can be loaded and unloaded; objects can be positioned around the robot for work to be performed on them).

Other embodiments of the present invention will be apparent to those skilled in the art from consideration of the specification. It is intended that the specification and figures be considered as exemplary only, with a true scope and spirit of the invention being indicated by the following claims.

That which is claimed is:

1. A Cartesian robot comprising:
   a base having a base mount attached to the base;
   a plurality of actuators attached to the base;
   a first actuator comprising a first linear actuator having a first piece attached directly to the base and a second piece movably attached to the first piece and having a first direction of travel parallel to a length of the base, and wherein the first actuator has a first collapsed position where the base and the first actuator do not extend beyond each other in opposing directions along the first direction of travel;
   a second actuator comprising a second rotary actuator having the second piece rotatably attached directly to a third piece that is movable between a second collapsed position adjacent the second piece and a second open position oriented perpendicular to the first direction of travel;

a third actuator comprising a third linear actuator having the third piece and a fourth piece that is movable in a third direction of travel that is oriented perpendicular to the first direction of travel when the third piece is in the second open position;

a fourth actuator comprising a fourth rotary actuator having the fourth piece and a fifth piece that is movable between a fourth collapsed position adjacent the fourth piece and a fourth open position oriented perpendicular to the third direction of travel;

a fifth actuator comprising a fifth linear actuator having the fifth piece and a sixth piece that is movable in a fifth direction of travel that is oriented perpendicular to the first direction of travel and perpendicular to the third direction of travel when the second piece is in the second open position and the fourth piece is in the open position;

a sixth actuator comprising a sixth rotary actuator having the sixth actuator piece and a seventh piece that is movable between a sixth collapsed position adjacent the sixth piece and a sixth open position oriented perpendicular to the third direction of travel and parallel to the first direction of travel; and a seventh actuator comprising a seventh linear actuator having the seventh piece and an eighth piece that is movable in a seventh direction of travel that is oriented perpendicular to the sixth direction of travel and perpendicular to the third direction of travel when the second piece is in the second open position and the fourth piece is in the open position.

2. The cartesian robot as described in claim 1, further comprising
an eighth actuator comprising an eighth rotary actuator having the eighth piece and a ninth piece that is oriented perpendicular to the seventh direction of travel; and
a tool connected to the eighth actuator.

3. The cartesian robot as described in claim 1, wherein the base is fixed to a foundation.

4. The cartesian robot as described in claim 1, wherein the base is adapted to move while the robot is in use.

5. The cartesian robot as described in claim 1, wherein the base is adapted to move between robot operations.

6. The cartesian robot as described in claim 1, further comprising outriggers actively attached to one of the plurality of actuators.

7. The cartesian robot as described in claim 1, further comprising a plurality of outriggers actively attached to a plurality of actuators.

8. The cartesian robot as described in claim 1, further comprising
the third actuator having a top side and a bottom side as oriented on the perpendicular ends of the third actuator, and
a support wheel mounted on the bottom of the third actuator.

9. The cartesian robot as described in claim 1,
wherein the space envelope of the fully collapsed robot relative to the working envelope of the robot when it is fully unfolded is greater than 100 to 1,
wherein the space envelope of the fully collapsed robot is measured when the second, fourth, and sixth rotary actuators are fully folded so that the first, third, fifth and seventh linear actuators are parallel with each other such that the robot is contained in its entirety within the bounds of a smallest possible rectangular cuboid, and
wherein the working envelope is the area which can be reached by the robot for the purpose of doing work when the second, fourth and sixth rotary actuators are oriented such that the third, fifth, and seventh directions of travel are perpendicular to each other.

10. The cartesian robot as described in claim 1,
wherein the space envelope of the fully collapsed robot relative to the working envelope of the robot when it is fully unfolded is greater than 50 to 1,
wherein the space envelope of the fully collapsed robot is measured when the second, fourth, and sixth rotary actuators are fully folded so that the first, third, fifth, and seventh linear actuators are parallel with each other such that the robot is contained in its entirety within the bounds of a smallest possible rectangular cuboid, and
wherein the working envelope is the area which can be reached by the robot for the purpose of doing work when the second, fourth, and sixth rotary actuators are oriented such that the third, fifth, and seventh directions of travel are perpendicular to each other.

11. The cartesian robot as described in claim 1,
wherein the space envelope of the fully collapsed robot relative to the working envelope of the robot when it is fully unfolded is greater than 20 to 1,
wherein the space envelope of the fully collapsed robot is measured when the second, fourth, and sixth rotary actuators are fully folded so that the first, third, fifth, and seventh linear actuators are parallel with each other such that the robot is contained in its entirety within the bounds of a smallest possible rectangular cuboid, and
wherein the working envelope is the area which can be reached by the robot for the purpose of doing work when the second, fourth, and sixth rotary actuators are oriented such that the third, fifth, and seventh directions of travel are perpendicular to each other.

12. The cartesian robot as described in claim 1,
wherein the space envelope of the fully collapsed robot relative to the working envelope of the robot when it is fully unfolded is greater than 10 to 1,
wherein the space envelope of the fully collapsed robot is measured when the second, fourth, and sixth rotary actuators are fully folded so that the first, third, fifth, and seventh linear actuators are parallel with each other such that the robot is contained in its entirety within the bounds of a smallest possible rectangular cuboid, and
wherein the working envelope is the area which can be reached by the robot for the purpose of doing work when the second, fourth, and sixth rotary actuators are oriented such that the third, fifth, and seventh directions of travel are perpendicular to each other.

13. The cartesian robot as described in claim 1,
wherein the space envelope of the fully collapsed robot relative to the working envelope of the robot when it is fully unfolded is greater than 5 to 1,
wherein the space envelope of the fully collapsed robot is measured when the second, fourth, and sixth rotary actuators are fully folded so that the first, third, fifth, and seventh linear actuators are parallel with each other such that the robot is contained in its entirety within the bounds of a smallest possible rectangular cuboid, and
wherein the working envelope is the area which can be reached by the robot for the purpose of doing work when the second, fourth, and sixth rotary actuators are oriented such that the third, fifth, and seventh directions of travel are perpendicular to each other.

14. The cartesian robot as described in claim 1,
wherein the space envelope of the fully collapsed robot relative to the working envelope of the robot when it is fully unfolded is greater than 1 to 1,
wherein the space envelope of the fully collapsed robot is measured when the second, fourth, and sixth rotary actuators are fully folded so that the first, third, fifth, and seventh linear actuators are parallel with each other such that the robot is contained in its entirety within the bounds of a smallest possible rectangular cuboid, and
wherein the working envelope is the area which can be reached by the robot for the purpose of doing work when the second, fourth, and sixth rotary actuators are oriented such that the third, fifth, and seventh directions of travel are perpendicular to each other.

15. The cartesian robot as described in claim 1, further comprising
outriggers attached to the fixed piece of the third actuator, whereby the outriggers provide supplemental support to the third actuator.

16. The cartesian robot as described in claim 2, wherein the tool attached to the eighth actuator is a nozzle for use in dispensing material.

17. The cartesian robot as described in claim 2, wherein a movement of one of the first, second, third, fourth, fifth, sixth, seventh, or eighth actuators is initiated by an electric motor.

18. The cartesian robot as described in claim 17,
further comprising a computer control operatively connected to the electric motor.

19. The cartesian robot as described in claim 2, wherein a movement of a plurality of the first, second, third, fourth, fifth, sixth, seventh, or eighth actuators is initiated by a plurality of electric motors, and a computer control operatively connected to the plurality of electric motors.

20. The cartesian robot as described in claim 2, wherein the tool comprises an offset nozzle that places an end of the offset nozzle outside of a vertical profile of the actuators.

* * * * *